Nov. 14, 1939.  W. T. ANDERSON, JR  2,179,606
METAL VAPOR ARC LAMP
Filed March 24, 1938
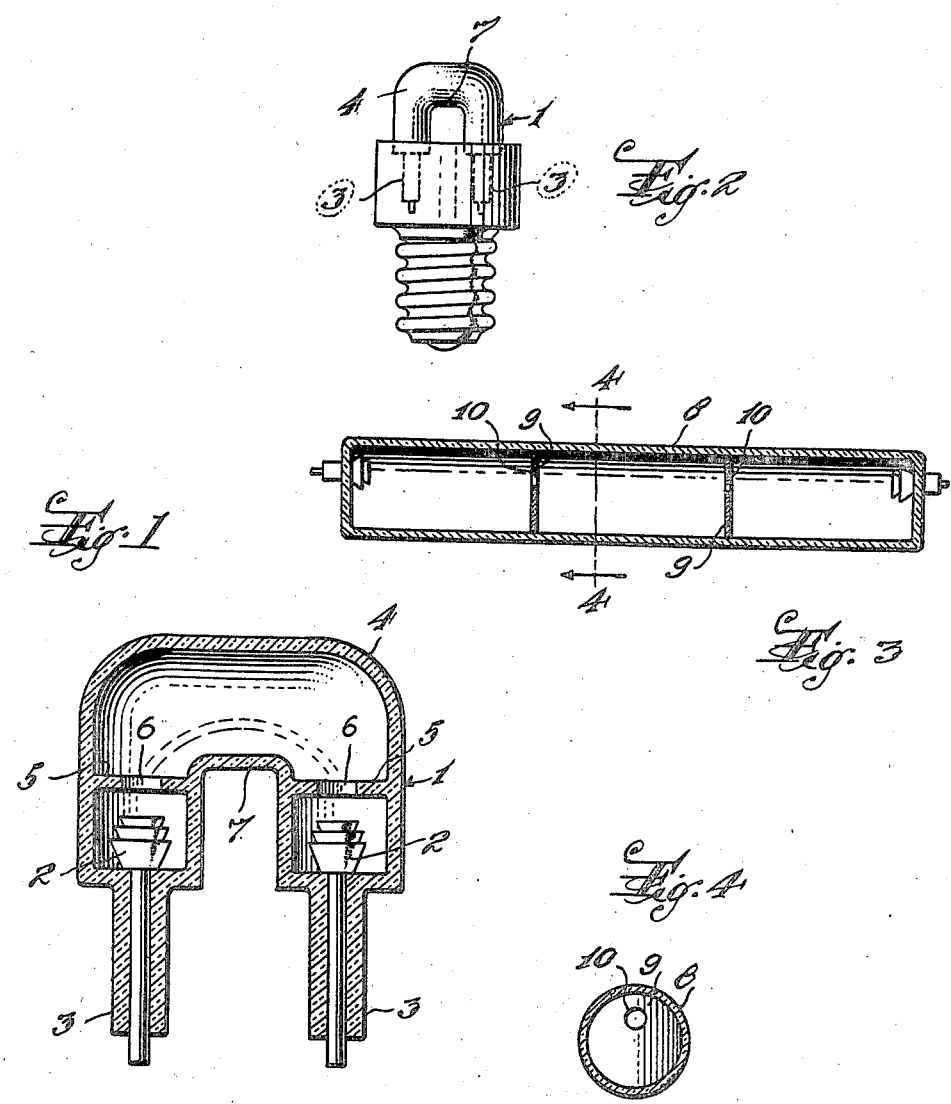
INVENTOR
William T. Anderson Jr
BY
Fredk C Fischer
ATTORNEY Patented Nov. 14, 1939

2,179,606

UNITED STATES PATENT OFFICE 2,179,606

METAL VAPOR ARC LAMP

William T. Anderson, Jr., Newark, N. J., assignor to Hanovia Chemical and Manufacturing Company, Newark, N. J., a corporation of New Jersey Application March 24, 1938, Serial No. 197,823

5 Claims. (Cl. 176—122)

This invention relates in particular to metal vapor arc lamps in which the arc is enclosed within economically costly glassy vitreous materials transparent to ultraviolet radiations and which have a loss in ultraviolet output during the life of the device. A typical example of such a lamp is the quartz mercury arc.

Many factors determine the qualitative and quantitative output of ultraviolet from a quartz mercury arc. These are well known in the art and only the one factor to which this invention relates need be mentioned here. This factor is the transparency of the glasseous envelope by which the arc discharge is enclosed and through which the useful ultarviolet generated within the arc must pass.

Fused silica quartz glass possesses the highest transparency for ultraviolet radiations obtainable for practical utility. When used for the envelope of the mercury arc, it is continually subjected to physical stress in the form of radiations, metallic atomic bombardment and increased temperatures which result in continual crystallographic changes, and physical and chemical alteration in the inner surface subject to the bombardment. These changes in the quartz glass result in lowered transparency to all radiations, but in particular the loss in transparency is most marked in the portion of the ultraviolet spectrum 3000 Angstrom units and shorter which is so useful in therapeutic applications and in the prevention of rickets in children.

The rate at which these alterations in the transparency of the quartz glass envelope of a quartz mercury arc lamp occur, depends upon a number of factors, such as the nature of the gas filling, the current and wattage input, the voltage drop per inch of arc length, the dimensioning and cross section of the fused quartz vessel, and the extent of external cooling upon the vessel. Even under the most ideal conditions changes in transparency cannot be eliminated, but experience has shown that the effects may be minimized and delayed by the construction of the quartz glass envelope in such large dimensions that the arc stream is sufficiently far from the walls of the vessel to reduce the bombarding and heating effects.

Commercial quartz mercury arc lamps in which the useful life has been rated in the thousands of hours are constructed with oversize envelopes in order to provide for a slow rate of deterioration. The high temperatures at which fused quartz must be worked, the necessity for great purity in the raw materials, and the skilled labor required to work it, have resulted in fused quartz glass being economically a very costly glass to produce. This together with the need for oversized envelopes has placed the quartz mercury arc lamp in a cost class greatly above all other light generators.

The ultraviolet radiations from the quartz mercury arc are very desirable in the home for their effects in promoting proper bone growth and formation in the young, and for their stimulating effects on the human mechanism. While many ultraviolet transmitting glasses which are less costly than fused quatz are available for use as lamp envelopes, none of these approach fused quartz with respect to their transparency to ultraviolet radiations. The high cost of fused quartz consistent with a reasonable useful life has relegated the quartz mercury arc lamp to the luxury class of modalities.

It is an object of this invention to provide an arc lamp which has the same power input and the same radiation emission as present commercial lamps, but utilizing less fused quartz glass in its construction, and at the same time obtaining a deterioration rate no greater than that obtainable in lamps of larger bulbs.

A further object is the provision of an arc lamp which has the same power input and the same radiation emission as present commercial lamps, but using the same quantity of fused glass in its construction, and deteriorating, from the standpoint of utility, much more slowly in its output of short ultraviolet radiations.

A further object is the provision of an arc lamp having a higher power input and a larger ultraviolet output, but not using any more fused quartz than was previously required for smaller powered lamps having substantially the same rate of deterioration.

In my invention, which I will now proceed to describe, I have found it possible to design and shape the fused quartz envelope in such a fashion that the destructive action of the arc is mostly limited to a small segment of the arc tube, and I control the location of this segment in a manner whereby it does not contribute materially to the useful ultraviolet output from the lamp. By this means I have achieved an enclosed quartz mercury arc lamp which maintains practically constant ultraviolet output for its rated electrical input during the life of the device with the employment of the same quantity of quartz glass as is now used in commercial lamps, and if I am content to have a loss in ultraviolet output comparable with that now shown by commercial quartz mercury arc lamps, I can construct according to my invention such lamps employing in their construction considerably less quartz glass than is now required and thereby effecting a very considerable reduction in their cost which means that these lamps can have a broader field of use.

I obtain these very desirable results by constructing the arc envelope in such a form that the arc hugs one side of the vessel, which side experiences practically all the destructive deterioration, and arranging the form of the arc vessel and mounting it in the lamp in such a way that the deteriorating section of the arc vessel contributes no or negligible amounts of radiation to the useful emitted radiation. I can even construct my device to contribute a zero amount of ultraviolet radiation on the section which is designed to deteriorate by coating this section externally with a suitable opaque covering, such as for example, gold or platinum ceramic paints, or by shielding with a metal covering.

These and other advantageous objects, which will later appear are accomplished by the simple and practical construction and arrangement of parts hereinafter described and exhibited in the accompanying drawing, forming part hereof, and in which:

Fig. 1 is a sectional view of an arc lamp embodying the invention,

Fig. 2 is an elevational view showing the lamp mounted in a screw base for insertion in a standard electrical receptacle, Fig. 3 is an elevational view of a straight tube embodying the invention, and Fig. 4 is a sectional view taken on line 4—4 of Fig. 3.

Referring to the drawing, in Fig. 1 there is shown an arc lamp 1 of substantially C-shape. Electrodes 2, which are of the solid type and are provided with vacuum type lead-in seals 3 form the legs of the arc lamp having the shape of the letter C. The arc vessel 4 forms the body of the C, and between the arc vessel 4 and the electrodes 2 are provided septums 5, each provided with a small orifice 6 through which passes the arc discharge from the electrodes through the arc vessel. It is essential that the orifices 6 be on or nearly on an arc (actually semi-circle) which forms the arc approximates, serving to shape the discharge arc in such a way that in the arc vessel 1, the arc stream (shown in dotted lines) is nearly contiguous with the inside wall 7 of the arc vessel 1.

If desired, a quartz mercury arc tube, such as above described, can be mounted in a housing as illustrated in Fig. 2, which is constructed with either the well known type of screw base or a blade type of base for insertion in standard electrical receptacles connected to a source of electric power and current limiting devices suitable for arc operation. This construction is suitable for use with reflectors, and the portion 7 of the arc vessel which will undergo most of the deterioration is so located and shielded that any light emitted is for the most part not utilized.

My invention of controlled deterioration in quartz mercury arc lamps is not confined to a form as shown in Figures 1 and 2. It may be equally well applied to arc tubes of any shape provided that it is not required that all sides of the arc tube provide radiation. It is one fundamental axiom of my invention that one side of the arc vessel must not contribute materially to the useful radiation from the device.

In Fig. 3 is illustrated a straight tube arc 8 provided with septums 9 and eccentric orifices 10 to keep the arc stream near one side of the arc tube and to concentrate the deterioration on this one side. These septums must usually be not greater than 2 inches apart. The number required is therefore dependent upon the length of the arc tube. A tube made in this manner is suitable for use with a reflector since there must, in all instances, be normally a break in a reflector immediately behind the arc tube of mercury arc lamps in order to ventilate the tube and to prevent reflection of light and heat back into the arc tube.

As previously mentioned, while my device for keeping the arc stream near one wall of the arc vessel is devised primarily to enable the construction and operation of quartz metallic vapor arc lamps with smaller fused quartz envelopes than could normally, without rapid loss in ultraviolet emission, be employed at the current and wattage inputs used, my arrangement is also suitable for use with larger fused quartz envelopes where a very constant ultraviolet emission per watt of input is more important than economies effected by less costly quartz envelopes. For example, a minimum of ultraviolet radiation loss is especially necessary in commercial photo-chemical processes such as photographic reproductions where a very constant product is required.

The following is cited as an example of my invention. A straight quartz tube 10 mm. (3/8") inside bore and with a 2 mm. wall was provided with a septum at each end with a central orifice 3 mm. in diameter and an electrode chamber on each end with solid activated electrodes (U. S. Patent 2,006,081, Anderson and Bird). The distance between the electrodes was exactly 2 inches. The lamp was filled with a little mercury and argon gas. It was operated at a current of 1 ampere and 100 watts input (50 watts per inch). The ultraviolet (3130 Angstroms to 2200 Angstroms) was measured at a distance of 20 inches from the side of the arc tube and was found to be 156 microwatts per sq. cm. After 300 hours of use, the intensity of the ultraviolet radiation was again measured at 100 watts input in the burner and was found to be 114 microwatts per sq. cm. This is 73 per cent of the original intensity.

A similar lamp was constructed excepting that it was shaped as shown in Fig. 1. This lamp was also operated at 1 ampere and 100 watts input in the burner (50 watts per inch). The arc hugged the inside wall of the lamp. The initial intensity at 20 inches was 160 microwatts per sq. cm. At the end of 300 hours of use, the measured intensity for the ultraviolet (3130 Angstroms to 2200 Angstroms) was 154 microwatts per sq. cm., or 96 per cent of the original value.

The existence of a constricted stringy arc, that is a high pressure arc in which the wattage per cubic centimeter of envelope volume exceeds 10 watts, is required for a fulfillment of the invention. This in terms of pressure means about half an atmosphere or greater.

While the above description specifically refers to quartz glass, obviously the invention particularly as it applies to a slowed rate of deterioration of the envelope for the useful shorter ultraviolet can be applied to any ultraviolet transmitting glass that has been properly proportioned. Likewise while I have specifically mentioned mercury vapor arcs, my invention would function similarly with other metal vapors such as for example cadmium.

The foregoing disclosure is to be regarded as descriptive and illustrative only, and not as restrictive or limitative of the invention, of which, obviously, embodiments may be constructed, including many modifications, without departing from the spirit and scope of the invention herein set forth and denoted in the appended claims.

Having thus described my invention, what I claim as new and desire to secure by Letters Patent, is:

1. A vapor electric arc lamp, comprising a vitreous vacuum vessel having a tubular arc chamber terminating at each end thereof in an electrode chamber containing solid electrodes, a filling of rare atmospheric gas and mercury, two or more septums mounted in the arc chamber and having eccentric orifices through which the arc stream passes, means for supplying electric power to said electrodes sufficient to produce a constricted arc stream, said septums being spaced so that the constricted arc stream remains adjacent to one and the same side of the arc tube during its passage through the orifices in the septums.

2. In a vapor electric arc lamp, a vitreous vacuum vessel, electrodes mounted in the ends of said vessel, means for supplying sufficient electric power to said electrodes to produce a stringy arc discharge through the vessel, a plurality of septums positioned in said vessel and spaced apart, said septums having orifices eccentric to the vessel so that the arc discharge will be maintained eccentric of the vessel and adjacent one side thereof.

3. In a vapor electric arc lamp, a vitreous vacuum vessel, electrodes mounted in the ends of said vessel, means for supplying sufficient electric power to said electrodes to produce a stringy arc discharge through the vessel, a plurality of septums positioned in said vessel and spaced apart, said septums having orifices eccentric to the vessel so that the arc discharge will be maintained eccentric of the vessel and adjacent one side thereof, and means for shielding the side of the vessel adjacent the arc discharge to prevent materially the passage of light through said side.

4. A vapor electric arc lamp, comprising a C-shaped vitreous vacuum vessel having an arc chamber and a pair of electrode chambers, solid electrodes mounted in said electrode chambers, vacuum lead-in seals for supplying electric power to said electrodes, a septum between each electrode chamber and the arc chamber, each septum having an orifice serving to position the arc stream between the electrodes substantially contiguous with the inside walls of the arc chamber and causing said arc stream to follow an arcuate path having a radius substantially equal or less than the smallest diameter of the arc chamber.

5. A vapor electric arc lamp, comprising a C-shaped vitreous vacuum vessel having an arc chamber and a pair of electrode chambers, solid electrodes mounted in said electrode chambers, vacuum lead-in seals for supplying electric power in excess of 10 watts per centimeter of lamp volume through a current limiting device to said electrodes, a septum between each electrode chamber and the arc chamber, each septum having an orifice serving to position the arc stream between the electrodes substantially contiguous with the inside wall of the arc chamber and causing said arc stream to follow an arcuate path having a radius substantially equal or less than the smallest diameter of the arc chamber.

WILLIAM T. ANDERSON, Jr.